United States Patent [19]

Vaida et al.

[11] Patent Number: 4,884,510
[45] Date of Patent: Dec. 5, 1989

[54] TRANSFER SLIDE ASSEMBLY AND SYSTEM

[75] Inventors: Robert M. Vaida, Ellington; Harold L. Osthus, West Willington; Richard Kuchta, Tolland, all of Conn.

[73] Assignee: Gerber Garment Technology, Inc., Tolland, Conn.

[21] Appl. No.: 249,442

[22] Filed: Sep. 26, 1988

[51] Int. Cl.⁴ .................... B61B 3/00; E01B 25/22
[52] U.S. Cl. ..................................... 104/91; 104/102; 104/130; 104/88
[58] Field of Search .................... 106/91, 89, 93, 96, 106/101, 102, 106, 100, 103, 104, 130, 172.1, 172.4, 253, 249, 88

[56] References Cited

U.S. PATENT DOCUMENTS

| | | | |
|---|---|---|---|
| 4,372,218 | 2/1983 | Ostlund | 104/91 |
| 4,615,273 | 10/1986 | Osthus et al. | 104/130 X |
| 4,667,602 | 5/1987 | Vaida et al. | 104/253 |
| 4,700,633 | 10/1987 | Weiselfish et al. | 104/102 |

*Primary Examiner*—Douglas C. Butler
*Attorney, Agent, or Firm*—McCormick, Paulding & Huber

[57] ABSTRACT

A transfer slide is used in a conveyor system to advance a trolley from one position to another position and includes a body fixed to a free end of a rail and has a cavity formed substantially throughout its length. The body has longitudinally extending surfaces spaced apart from one another by an opening communicating with the cavity which surfaces provide a rolling surface upon which a trolley travels. A slide is received within the cavity of the body and reciprocates within the body in response to the reciprocating movements of an actuator means connected with the slide. The slide has a pusher device extending upwardly from the body and above the rail and which pusher device is engageable with the trolley to push it from the initial position to a final position.

23 Claims, 17 Drawing Sheets

TRANSFER SLIDE ASSEMBLY AND SYSTEM

CROSS REFERENCE TO RELATED APPLICATION

The present application relates to copending application Ser. No. 249,596 filed on Sept. 26, 1988 and entitled SEGMENTED RAIL ASSEMBLY FOR CLOSED WORKPIECE CONVEYOR SYSTEM which application is commonly assigned with the present application.

BACKGROUND OF THE INVENTION

The present invention relates to a device for engaging a movable object at one position and advancing it to another position and more particularly relates to a transfer slide assembly employed in a rail conveyor system for transferring a trolley from a rail in a subsidiary system onto an elevator for movement upwardly to a main rail system.

U.S. Pat. No. 4,615,273 discloses a conveyorized transport system of the type embodying the transfer slide assembly of the present invention having a main rail upon which trolleys ride, subsidiary loops located along the main rail leading to and from a work station, and switching means for transferring a trolley between the main rail and each subsidiary loop. It is known to utilize an elevator having a slotted track section which receives a trolley crown portion to lift the trolley from a position adjacent the lower free end of an inclined subsidiary loop rail upwardly toward the switching means for transfer onto the main rail of the conveyor. While the elevator car is sized and shaped to receive the crown portion of the troley, the trolley must be actively and positively pushed or pulled into the elevator car because a trolley travelling down the inclined subsidiary loop rail towards the elevator usually cannot consistently travel from the rail into and through the narrow confines of the elevator car slotted track under the force of its own momentum. In addition, the forward movement of a trolley rolling down off of the inclined subsidiary loop rail end may often be arrested or be significantly reduced by the trolley crown portion entering into the elevator slotted track. Moreover, trolley side sway occurring as the trolley rolls down the rail may further prohibit the crown portion of the trolley from aligning with the elevator car slotted track and thus hinder the trolley from the entering the elevator car.

One type of device previously used to advance a trolley with positive force employs a piston and cylinder assembly such as the one suggested in U.S. Pat. No. 4,615,273 utilizing a hinged claw fixed to a piston rod for gripping a single trolley and pulling it into the slotted track of the elevator. One problem experienced in these previously known advancing mechanisms is the relatively complex mechanical structure of the hinged claw. Since the claw must operate to consistently engage and move successive numbers of trolleys into the slotted track of the elevator, the hinge and the other cooperating mechanical components may become worn and eventually breakdown. In addition, such hinged claw devices tend not to be self-contained compact mechanisms but instead usually involve awkwardly oriented grasping means such as the hinged claw depending from the laterally extending piston rod.

As previously mentioned, a trolley may tend to swing laterally relative to the longitudinal extent of the rail as it approaches the elevator car. This lateral swinging movement may at times prevent an advancing assembly such as the hinged claw from contacting and gripping th trolley crown portion and moving it into the elevator. Moreover, a trolley advancing device such as suggested in U.S. Pat. No. 4,615,273 engages the trolley crown which is positioned on the top portion of a trolley and thereby advances the trolley into the elevator by pulling the trolley from the top. As a result, a yet further problem of tilting about the trolley roller axes occurs when the trolley carries a substantially heavy garment piece and is pulled from its top crown portion by an advancing device. Tilting motion of this type may cause the crown portion of the trolley to become dislodged from the advancing device and in turn may subsequently cause the trolley not to be advanced into the slotted track of the elevator car.

Accordingly, it is the object of the present invention to provide a transfer slide assembly supported at the end of the subsidiary loop rail and positioned adjacent an elevator in a conveyorized transport system having means for positively engaging with a trolley and moving successive ones of such trolleys consistently into the elevator for movement upwardly to a main conveyor rail system.

It is yet another object of the present invention to provide a compact and mechanically simplified transfer slide assembly usable in a conveyorized transport system having generally a two-piece construction such that one piece is fixed to the rail while second piece slides relative to the first to positively push the trolley onto an elevator.

A further object of the present invention is to provide a transfer slide assembly having a dual action stroke capable of advancing a trolley into registry within a slotted track serving as an elevator car.

SUMMARY OF THE INVENTION

A transfer slide assembly is used to advance a trolley from one position to another position and includes an elongate body having a longitudinal axis extending along the longitudinal extent of the body and has a cavity formed throughout the length of the body along the longitudinal axis and the body has at least two surfaces extending parallel with the body longitudinal axis and has an opening extending substantially with said cavity and communicating between the surfaces and the cavity, which surfaces being positioned along either side of the opening for providing a rolling surface upon which the trolley may move along the body. A slide is received within the cavity and is movable relative to the body along the longitudinal axis and has pusher means extending from the slide and is engagable with a trolley to push it from the one position to another position using actuator means for moving the slide relative to said body.

DETAILED DESCRIPTION OF THE PREFERRED EMBODIMENT

Figure 1:
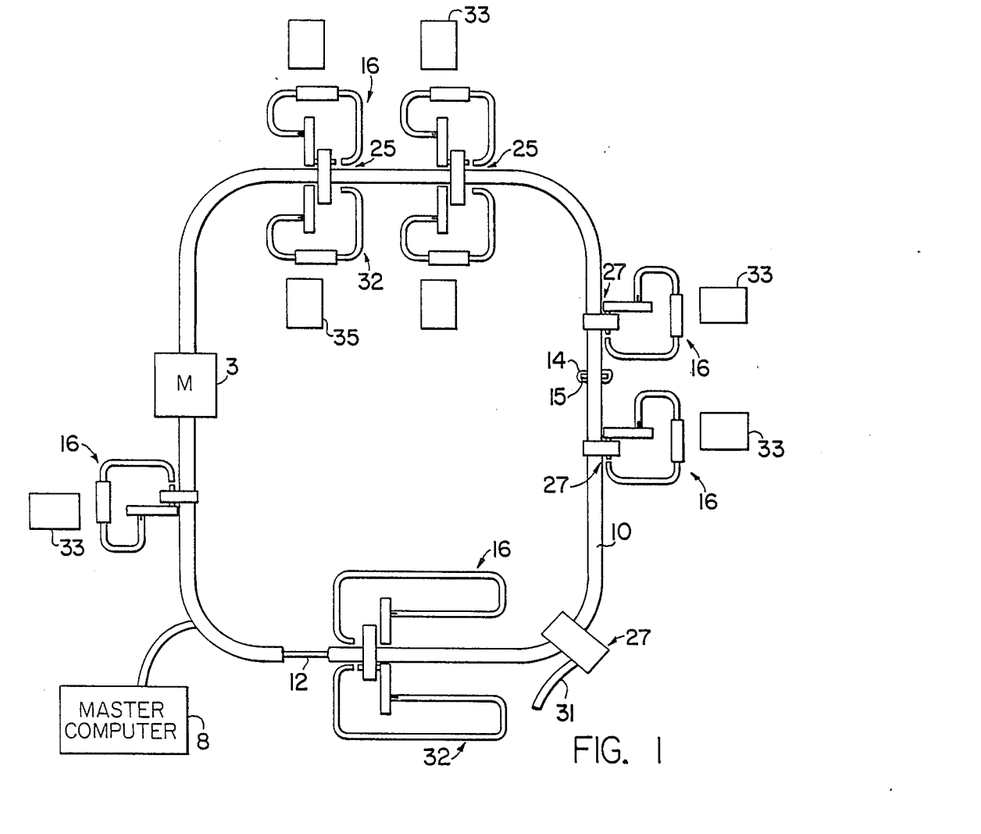
FIG. 1 is a top view of a conveyorized transport system employing the transfer slide assembly of the present invention.

Turning first to FIG. 1, a conveyorized transport system embodying the present invention includes a master computer 8, a propulsion track 10 having pushers 15 extending from it, a drive unit 3 for the propulsion track 10, a main rail 12 situated beneath the propulsion track 10, trolleys 14 riding on the rail 12 held by the pushers 15 and subsidiary loops 16 and 32 located along the main rail. Each subsidiary loop usually services a work station and includes a three position switch 25 for routing the trolleys between the main rail and each pair of subsidiary loops or directly between subsidiary loops of a given pair and two position switches 27 for routing the trolleys between the main rail and an unpaired subsidiary loop or a diversion rail 31.

Figures 2, 5, 6, 6A:
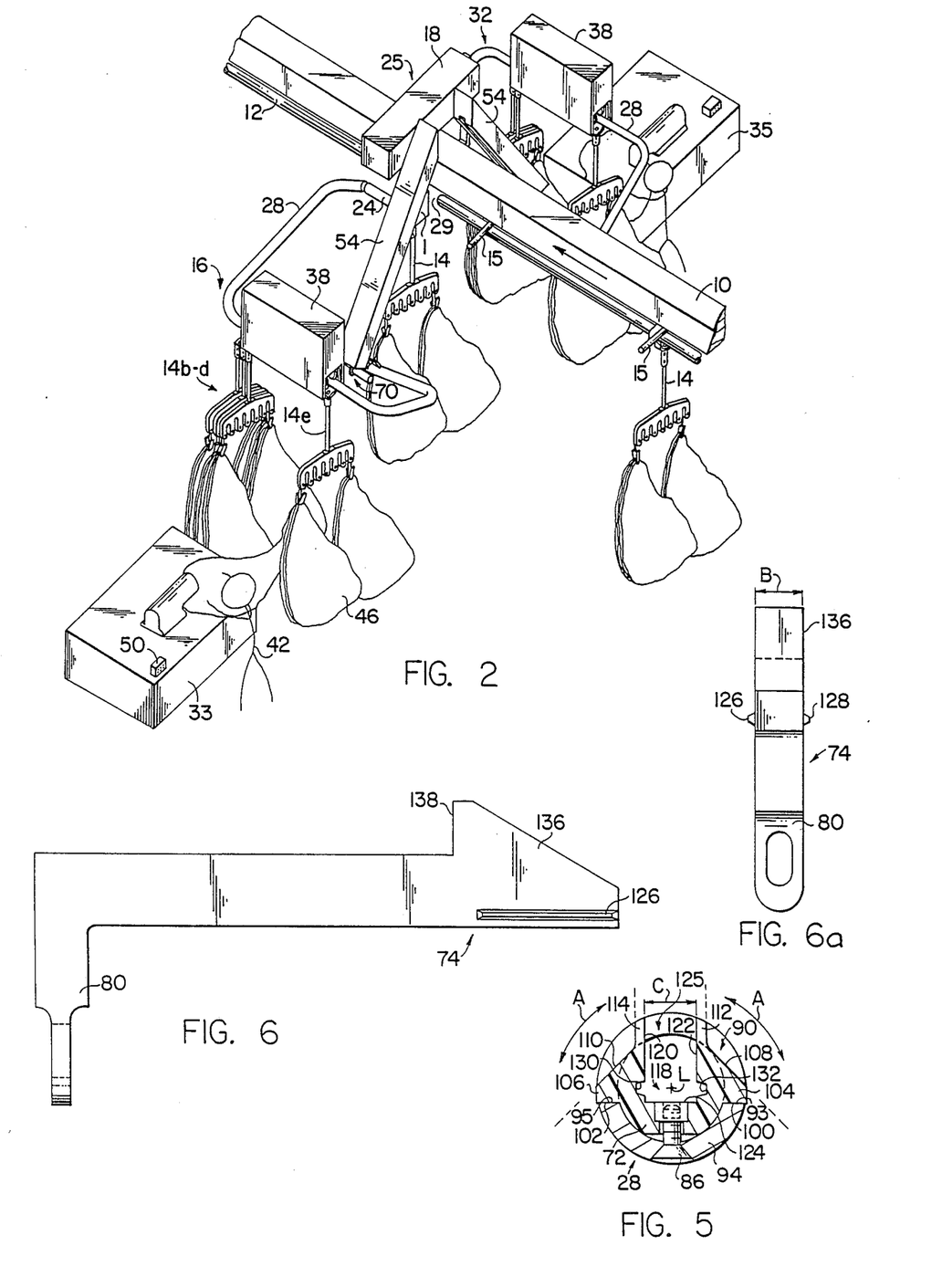
FIG. 2 is a perspective view of a section of the conveyorized transport system of FIG. 1 and includes a stretch of the main rail and propulsion track plus two oppositely disposed subsidiary loops each employing the transfer slide assembly of the present invention.
FIG. 5 is an enlarged view taken along line 5—5 in FIG. 4 showing a transverse cross section, the transfer slide body as it is fixed to the rail absent the slide normally received within the slide body.
FIG. 6 shows in side elevation view one embodiment of the slide used in the present invention.
FIG. 6a is an end view taken of the slide shown in FIG. 6 looking to the right.

FIG. 2 illustrates an isolated section of the conveyorized transport system shown in FIG. 1 and more particularly shows in detail the cooperation between the main rail 12, the propulsion track 10 and the pair of subsidiary loops 16, 32 servicing a pair of work stations 33, 35 positioned adjacent each subsidiary loop. The trolleys 14 ride on the main rail 12 and are propelled by one of the pushers 15 toward the subsidiary loops 16, 32 in the direction of flow indicated by the arrow drawn on track 10. Each subsidiary loop 16, 32 includes a looping rail 28, a stop assembly 38 and an elevator 54. The stop assembly 38 is one such as described in U.S. Pat. No. 4,667,602 issued on May 26, 1987 to Vaida et al. and which is commonly assigned to the assignee of the present application. The stop 38 is used as a gate to index and advance a single one of a number of trolleys collecting at the stop 38 to advance it down the inclined rail 28 toward the elevator.

The three position switch 25 having an actuator apparatus 18 for moving a section of rail 24 between laterally aligned gaps 29 in each of the subsidiary loops 16, 32 and the main rail 12, routes individual trolleys between the loops 16, 32 and the main rail 12. The actuator apparatus 18 is controlled by the computer 8 and selectively energizes the actuator 18 to alternatively position the rail section 24 thereby bridging and bridge one of the gaps 29 and effecting trolley transfer to the main rail from one of the subsidiary loops or from the main rail to either of the subsidiary loops. For a more complete description of the actuator apparatus operation, reference made be had to U.S. Pat. No. 4,615,273. Once a trolley is transferred onto the looping rail 28, it travels downwardly on the rail toward one of the work stations 33, 35 under the force of gravity and is further aided in its travel down the rail 28 by forward movement imparted to the trolley by the pusher 15 as it is moved off of and away from the transfer rail segment 24. The trolley travels down the rail 28 and arrives at the stop 38 where a series of trolleys 14b–d may collect at a stop upper gate. A downstream gate located at the other end of the stop 38 allows a single trolley 14e to be isolated from the remaining trolleys 14b–d so that an operator 42 has easy access to work pieces 46 carried by hanger 48 on the isolated trolley and in turn performs a work operation on such work pieces.

After the work operation is performed on work pieces 46, the operator releases the isolated trolley from the downstream gate of the stop 38 by pushing a button on control box 50 to cause the downstream gate to open and allow isolated trolley 14e to roll under the force of gravity down looping rail 28 toward the elevator 54. The trolley is then loaded onto a slotted track car carried by the elevator 54, and when the master computer 8 senses a break in a parade of trolleys on the main rail 12 it directs the elevator 54 to raise the trolley 14 upwardly toward the main rail. When the elevator car reaches the top, a next pusher 15 arrives and engages a crown located on the top portion of the trolley 14 and pushes the trolley from the slotted track elevator car onto the transfer rail 24 positioned in the gap 29 of the subsidiary loop adjacent the elevator. From the transfer rail section, the trolley 14 can either be transferred back to the beginning of the subsidiary loop 16, to main rail 12, or to the opposite subsidiary loop 32.

Figure 3:
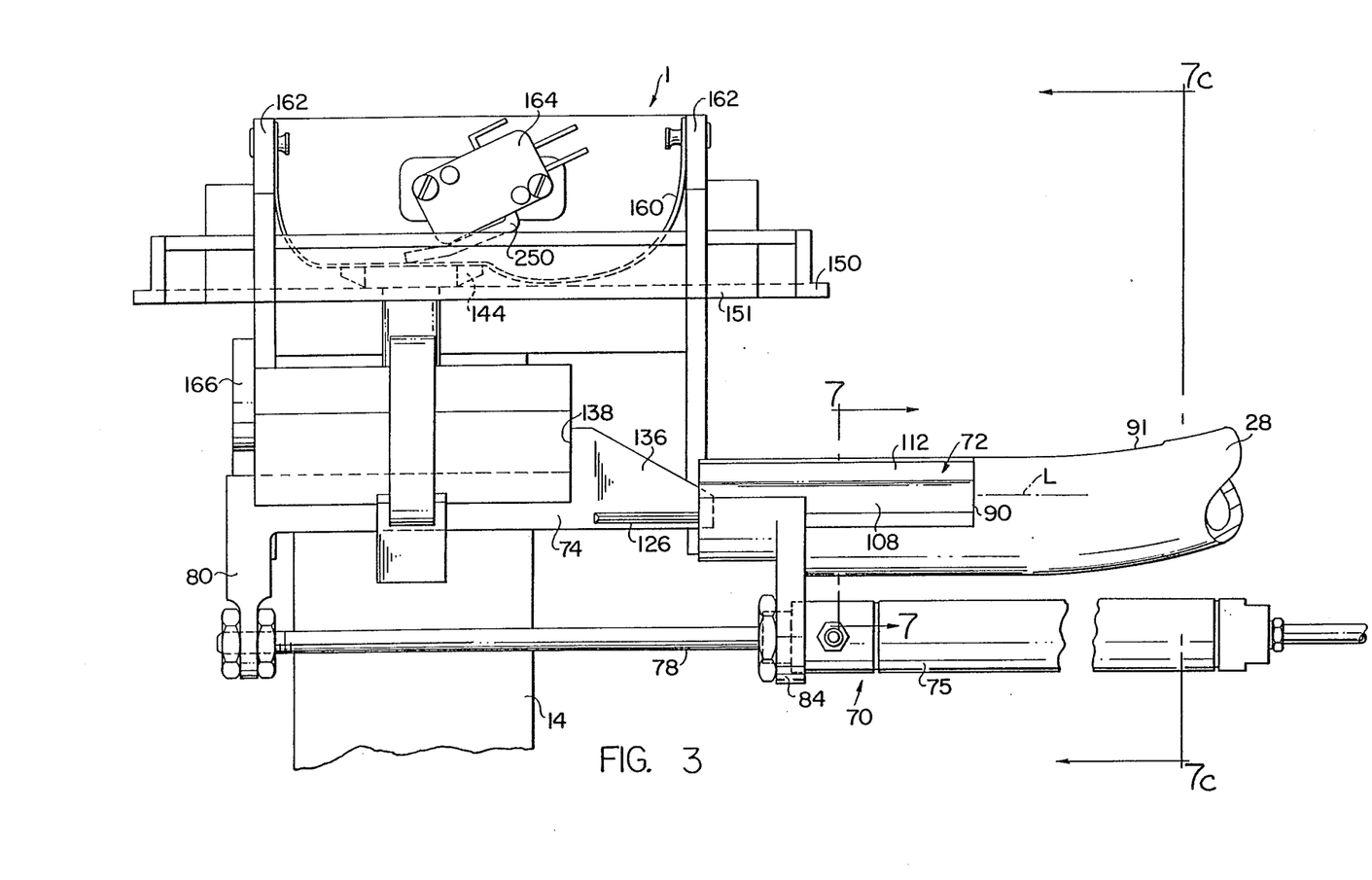
FIG. 3 is a side view of the transfer slide assembly as it is employed with the elevator assembly in the conveyorized transport system of FIG. 1 and 2 and shows the slide in its extended position.

In accordance with the invention, FIG. 3 shows a transfer slide assembly 70 fixed to the lower free end of the subsidiary rail 28 and functions to advance a single trolley 14 from the rail 28 into an elevator car 1 positioned adjacent the rail end. The transfer slide assembly of the present invention is comprised of a body 72 having a central longitudinal axis L and a slide 74 connected to a piston rod 78 of a double acting dual chamber pneumatic actuator 75 for moving a slide 74 in small strokes of approximately 3 to 4 inches away from and toward the body 72. The slide 74 is secured to the piston rod 78 through a slide depending portion 80 having an aperture for receiving the piston rod 78. The end of the piston rod is threaded at 82 and utilizes two adjusting nuts which may selectively position the depending portion 80 on the threaded portion 82 of the piston rod 78 to vary the stroke length is desired. The body 72 is fixed to the rail 28 by screws 86 threadably engaging the body 72 through openings formed in the rail 28 and has a body depending portion 76 rigidly mounting the dual acting actuator 75 such that the piston rod 82 slides relative to the stationary actuator secured to the body portion.

Figure 4:
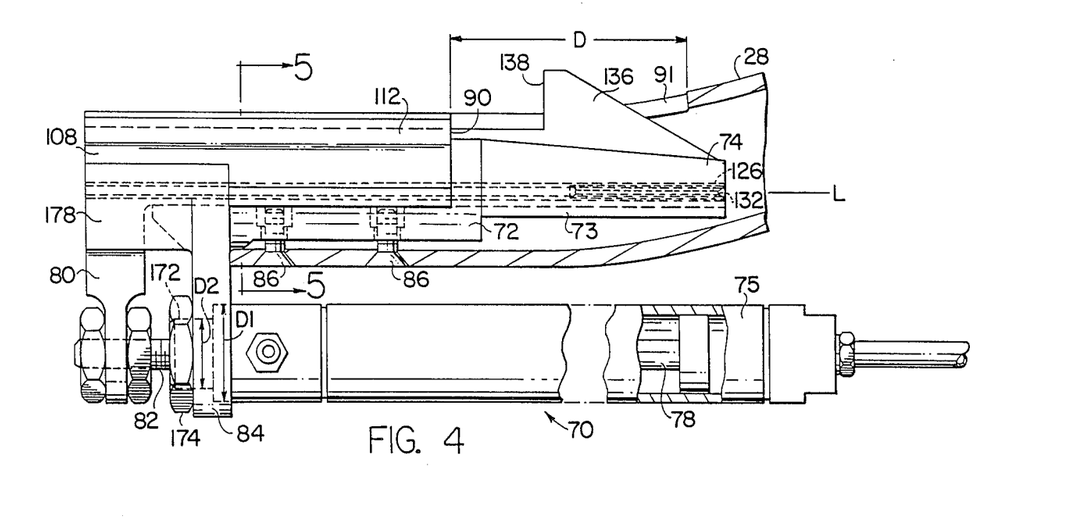
FIG. 4 is a sectional view of the transfer slide assembly embodying the present invention shown separately from the elevator and shows the slide in its retracted position.

One feature of the invention is the particularly compact and multipurpose design of the body 72. As shown in FIG. 4, the body 72 forms a segment of the rail 28 and provides a housing for the slide 74 while a depending portion 84 of the body 72 fixes the actuator 75 to the transfer slide assembly 70. The body depending portion 84 has a through counterbore formed throughout its width and defines a first larger diameter opening D-1 receiving the housing of the actuator 75 and a second smaller diameter D-2 opening receiving a threaded neck portion 172 of the actuator 75. A portion of the threaded neck portion 172 protrudes beyond the depending portion 84 such that a nut 174 threadably engages the exposed neck portion and when tightened draws the actuator 75 within the opening diameter D-1 to clamp it against the shoulder formed by the differing diameters. In addition, the free end of the body 72 is bifurcated at 178 so that the depending portion 80 of the slide 74 extends through the slot formed by the bifurcated end portions of the body 72 thus allowing the aperture in the slide depending portion 80 to be positioned adjacent the actuator 75 and in line with the rod 82.

Referring now to FIGS. 4 and 5, the body 72 of the transfer slide assembly 70 is shown attached to the rail 28 at its lowermost free end. A cutout 90 is formed in the rail 28 extending longitudinally from its free end along a segment of the length of rail 28. As shown in FIG. 5, the rail 28 is preferably formed from a hollow steel pipe and the cutout 90 therefore defines a lower C-shaped portion 94 having an inner curved surface 92. The body 72 has two correspondingly curved support surfaces 96 and 98 bearing against portions of the surface 92 to vertically position the body 72 on the rail 28. In addition, the body 72 has two flat surfaces 100 and 102 each of which extends in planes parallel to the axis L and each of which underlies two, laterally extending body arm portions 104 and 106. Each of the surfaces 100 and 102 also support the body 72 on flat, longitudinally extending upper surfaces 93 and 95 of the C-shaped portion 94 of the rail 28 formed by the cutout 90 and which flat surfaces also extend in planes parallel to the axis L. The screws 86 engaging within threaded openings in the body 72 and which pass through apertures formed in the bottom of the C-shaped portion 94 of the rail 28, secure the body 72 on the rail 28 such that it is vertically supported on both the flat surfaces 93, 95 and by portions of the inner curved surface 92. Thus, when the screws 86 are tightened, the body surfaces 100, 102, 96 and 98 are drawn into simultaneously engagement with the respectively confronting surfaces of the rail 28 thereby securing the body 72 against rotational and longitudinal movement relative to the rail 28.

Figure 7A:
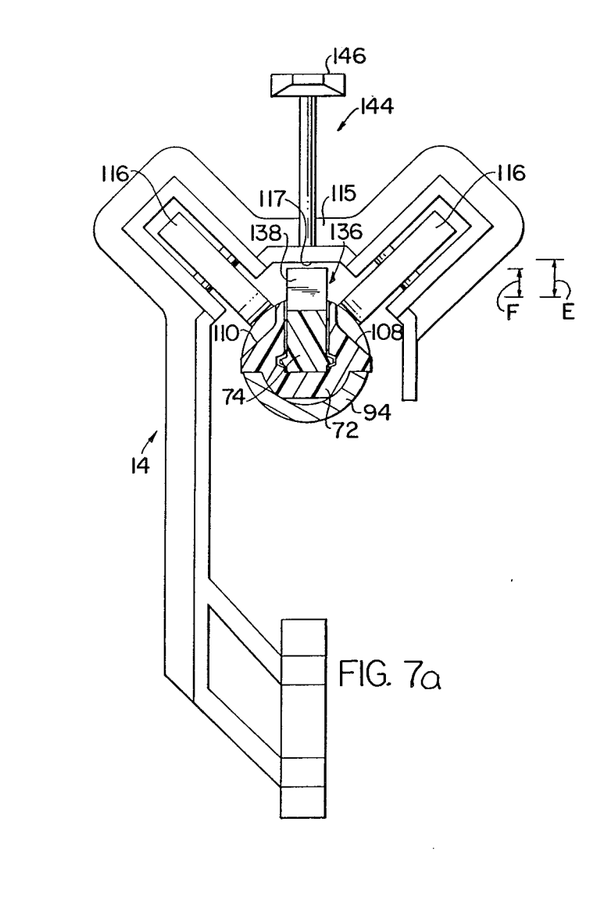
FIG. 7a is a view taken in transverse section along line 7—7 of FIG. 3 and shows a trolley riding downwardly along a subsidiary loop rail prior to engaging the body of the transfer slide assembly.
Figure 7B:
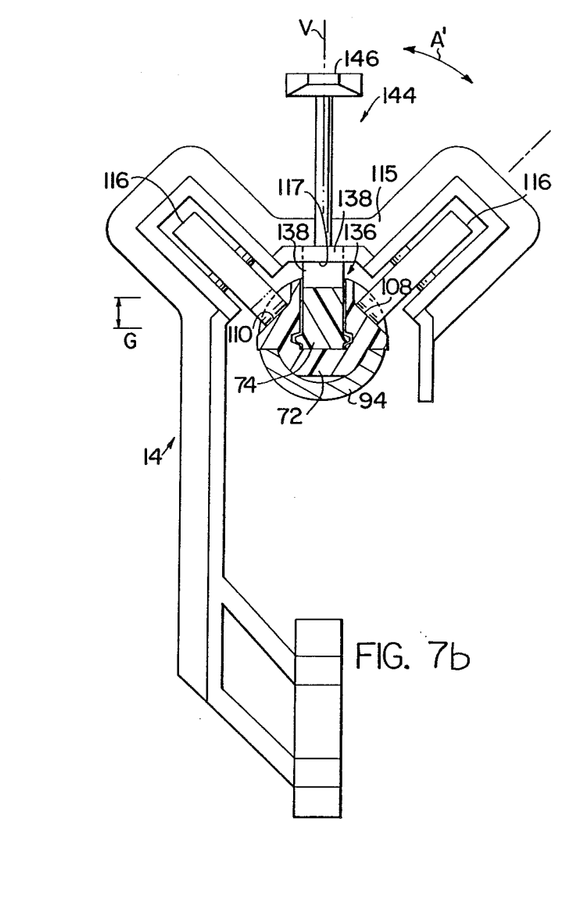
FIG. 7b is a view taken in transverse section along line 7—7 of FIG. 3 and shows a trolley engaging the body of the transfer slide assembly after having rolled off the subsidiary loop rail.
Figure 7C:
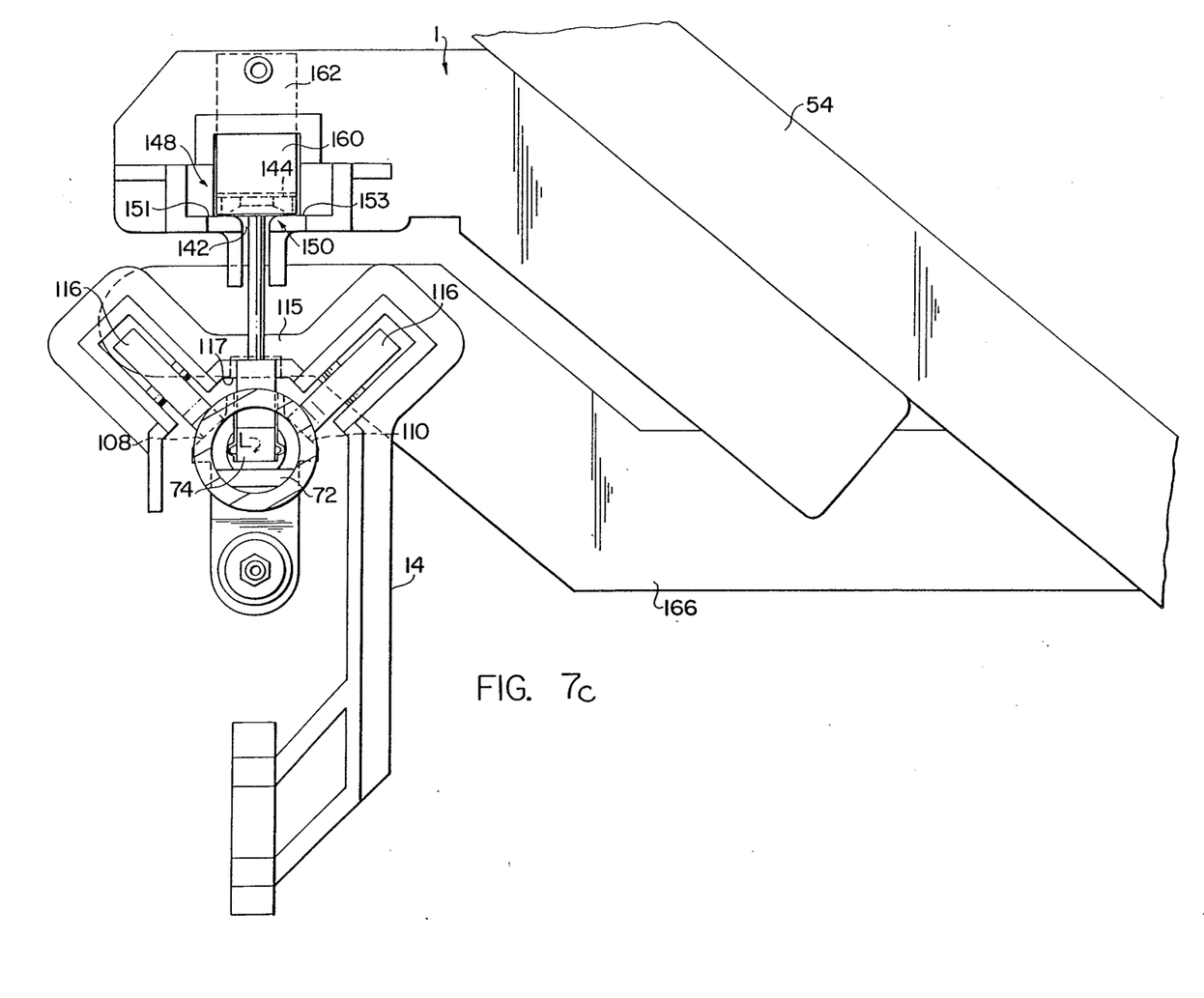
FIG. 7c is an end view taken along line 7c—7c of FIG. 3 and shows a trolley positioned on the body of the transfer slide assembly and in line with the elevator car prior to being advanced into it by the slide.

As shown in FIG. 5, each laterally extending arm portion 104 and 106 of the body 72 also has an upper surface respectively labelled 108 and 110 extending longitudinally along the body parallel to the axis L. The upper surfaces 108 and 110 are contiguous with two upstanding body portions 112 and 114 defining two spaced apart tracks. The outer surface of each of the upwardly extending portions 112 and 114 forms an angle A equal to approximately 135 degrees with each of the corresponding one of upper surfaces 108 and 110. The body upper surfaces 108 and 110 being disposed at such an angle relative to the upwardly extending body portions 112 and 114, provide a surface upon which the trolley 14 may be guided. In addition, the tracks 112 and 114 as shown in FIGS. 7a-c served to space and guide rollers 116 of the trolley 14 along the body 72 thereby preventing or ceasing trolley side sway once the trolley engages with the body 72.

The body 72 has an internal cavity 118 extending longitudinally along the central axis L and is defined by two, parallel spaced apart surfaces 120 and 122 transversely connected by a bottom surface 124 oppositely facing a cavity opening 125 to define a generally U-shaped cavity within the body 72. The cavity 118 is sized and shaped to receive the elongate slide 74 within its generally U-shaped confines. As shown in FIGS. 6 and 6a, the slide 74 carries two laterally and outwardly extending portions or guides 126 and 128 formed on opposite side faces of the slide 74. Each guide 126, 128 has in transverse cross section a truncated peak configuration engaging correspondingly shaped recesses 130 and 132 formed respectively in each of the confronting surfaces 120 and 122 defining the cavity 118 of the body 72. As is shown in FIG. 6a, the slide 74 has a width B which dimension is slightly smaller in size than the cavity width C shown in FIG. 5 by an amount equal to approximately six one thousandths of an inch. Similarly, a slight clearance equal to approximately two hundredths of an inch exists between the juxtaposed surfaces of the corresponding guides 126, 128 and recesses 130, 132 thus permitting relative movement therebetween. While the guides 126, 128 and recesses 130, 132 cooperate with one another to constrain the slide 74 from moving upwardly out of the cavity 118, it should be undertood that the slide 74 is preferably mounted within the cavity 118 such that slide bottom surface 134 contacts with and bears on the body transverse surface 124 as the slide 74 reciprocates along the axis L of the body 72. In addition, the body 72 and the slide 74 are formed from generally hard and rigid synthetic material such as, for example DELRIN, having a low frictional characteristic thus permitting slidable engagement between the slide 74 and the body 72.

When the slide 74 is fully extended as shown in FIG. 3, the slide depending portion 80 is supported by piston rod 78 while a portion of the slide 74 adjacent guides 126, 128 remains within and is supported by the body 72. Conversely, when the slide 74 is in the retracted position as shown in FIG. 4, the guides 126, 128 are received within the recesses 130, 132 extending into a rear portion 73 formed integrally with the body 72. The cavity 118 formed within the body 72 is continuous with the rear portion 73 such that the portion of the slide 74 extending into the rear portion 73 is supported by the lower cavity surface 124 and is laterally confined by the side walls 120 and 122 which likewise are coextensive with the surface 124.

The slide 74 shown in FIGS. 6 and 6a has a pusher 136 located at the end of the slide 74 adjacent the guides 126, 128 and has a vertically extending face 138 for contacting with a trolley. The support provided by the rear portion 73 is important because when the slide 74 is moved into the retracted position shown in FIG. 4, the pusher 136 is received within a slot 91 formed in the rail 28 and extending longitudinally beyond the edge of the cutout 90 such that the pusher 136 protrudes above the surface of the rail 28 along longitudinal length D of the slot 91. Thus, it should be appreciated that the stroke of the pusher 136 begins at a point along the distance D from the edge of the cutout 90 in the rail 28 and continues its advance along the body 72 until the slide 74 is extended to its outermost position.

As previously discussed, the transfer slide assembly 70 of the present invention loads a trolley 14 into the elevator car 1 for carriage upwardly to the mail rail 12 by advancing it from a position adjacent the free end of the rail 28 into the elevator car 1. The elevator 54 comprises a pneumatic lift (not shown) connected to the elevator car 1 riding on an inclined track between upper and lowermost positions. As is shown in FIG. 7c, the elevator car 1 consists generally of a split rail 148 having a slot 142 defining two laterally extending portions 151 and 153 of the elevator car 1. When the elevator car 1 is moved by the pneumatic lift to the lowermost elevator position by a command by the master computer 8, the slot 142 and the slide 74 become coaligned with one another in a plane which includes the longitudinal axis L of the body 72. Each trolley 14 carries an upwardly extending protrusion or crown 144 fixed to a transversely extending portion 115 of the trolley 14. The upwardly extending crown 144 is T-shaped and has a web thickness smaller in dimension than that of the width of the slot 142. A laterally extending flange 146 is connected to the top end of the web and defines a flange width of substantially greater dimension than that of the width of the slot 142. The web of the crown 144 is capable of being received within the slot 142 and a guide or an apron 150 having an outwardly tapered extension of the slot 142 is positioned at the open end of the elevator car 1 to facilitate the moving of the web into the slot 142.

In FIGS. 7a-c, the general operation of a transfer slide assembly is shown cooperating with a trolley 14 having been once it is released from the lower gate of the stop 38 in the subsidiary loop 16. The trolley typically travels down the rail 28 under the force of gravity toward the transfer slide assembly 70 on the angularly oriented rollers 116 which ride on the upper curved surface of the rail 28 such that an under surface 117 of the transversely extending portion 115 of the trolley 14 is spaced from the uppermost curved surface of the rail 28 by a distance represented as E in FIG. 7a. The pusher 136 extends upwardly beyond the upper curved surface of the rail 28 at a height represented by the dimension F being of a significantly smaller magnitude than that of the dimension E. Thus, it should be appreciated that the under surface 117 of the transverse portion 115 of the trolley 14 passes over the pusher 136 with a clearance equal to the difference between the dimensions E and F when the trolley travels along the surface of the rail portion labelled D as represented in FIG. 4.

Referring now to FIG. 7b, the trolley 14 is shown having travelled off of the upper surface of the rail 28 and onto the longitudinally extending surfaces 108 and 110 of the body 72. Since the longitudinally extending surfaces 108 and 110 are oriented below the curved upper surface of the rail 28 upon which trolley 14 rides, the trolley 14 when it rolls off of the curved surface of the rail 28 drops downwardly onto the spaced apart longitudinally extending surfaces 108 and 110 and therefore experiences a height differential. The dimension G generally represents the drop experienced by the rollers 116 from the upper surface of the rail 28 downwardly to the body surfaces 108 and 110. Since the rollers 116 are inclined relative to the vertical plane V at an angle A' equal to approximately 45 degrees, the rollers 116 and surfaces 108 and 110 are disposed orthogonally with one another thus providing corresponding flush surfaces upon which the rollers 116 engage. Once the rollers 116 drop onto the surfaces 108 and 110, the trolley under surface 117 is no longer elevated above the pusher 136 as it was previously when the rollers 116 were supported on the upper surface of the rail 28. Rather, the pusher 136 now positioned behind the transverse portion 115 of the trolley 14 extends upwardly beyond the under surface 117 such that a portion of the pusher face 138 is engagable with the transversely extending portion 115 of the trolley 14. It should be understood that the drop dimension G must be greater in magnitude than the difference between dimensions E and F to insure that the pusher is engagable with the portion 115 of the trolley 14.

As is shown in FIG. 7c, the apron or guide 150 which extends outwardly from the elevator car 1 is positioned symmetrically about the longitudinal axis L of the body 72 when the elevator car 1 is in the lowermost position. The apron 150 and the laterally extending portions 151, 153 of the split rail 148 are contiguous with one another and form a support surface engagable with the lower surface of the flange 146 of the trolley 14. When the trolley 14 is supported on the body surfaces 108 and 110, and the trolley car 1 is oriented in its lowermost position, the lower surface of the flange 146 is spaced slightly above the supporting surface formed by the apron 150 and the laterally extending portions 151, 153 such that the flange 146 passes above the supporting surface without interfering with it. Thus, a trolley 14 travelling along the rail 28 drops downwardly onto the surfaces 108 and 110 of the body 72 and continues moving forwardly to initially position the web of the crown 144 within the slot 142 of the apron 150.

At this point, however, the crown 144 does not advance into the elevator car 1 beyond the apron 150 because a thin, flexible, C-shaped metal leaf spring 160 extends downwardly from transverse portions 162 of the elevator car 1 and slightly interferes with the path of the flange 146 into the elevator car 1. However, the spring being flexible is capable of being deflected upwardly by the flange 146 when the slide 74 pushes the trolley 14 into the elevator car 1. Once the flange 146 is received within the car 1, however, the spring 160 provides a sufficient downward biasing force to hold the flange 146 of the trolley 14 in place against the portions 151, 153 while it is being moved upwardly thus eliminating the need to use stops or other fastening devices while the trolley is upwardly moved. It should thus be appreciated that the trolley travelling along the rail 128 and onto the body 72, positions the crown 144 only within the apron 150 and not within the remaining portion of the elevator car 1. It is only when the trolley is advanced against the bias of the spring 160 by the pusher 136 that the crown 144 is completely received within the elevator car 1.

The actuator 75 is energized when a switch 164 is activated by the insertion of a trolley within the car 1. As is shown in FIG. 3, the switch 164 is mounted within the car 1 such that when the flange 146 deflects the spring upwardly, it also pushes upwardly the normally downwardly biased arm 250 of the switch 164. The switch 164 is connected to the master computer 8 and indicates to the computer 8 that the trolley 14 is in place within the car 1 and ready for carriage upwardly to the main rail 12. The actuator 75 is then energized by a command from the computer 8 which activates an electrically controlled valve and prompts the piston rod 78 to advance toward the elevator car 1. The pusher 136 thus engages the back face of the transversely extending portion 115 of the trolley 14 and thus forces the flange 146 between the spring 160 and the portions 151, 153 of the elevator car 1. The engaging surface of the leaf spring 160 is curved upwardly toward the transverse portion 162 of the car 1 such that the leading upper edge of the flange 146, which preferably is tapered for camming engagement, gradually engages the lower surface of the spring 160 to bias it upwardly as the trolley is advanced into the elevator car 1 by the pusher 136.

The slide 74 is substantially longer in length than the body surfaces 108, 110. This feature enables the pusher 136 to extend outwardly beyond the outer end of the body 72 in order to advance the trolley 14 off of the body surface 108, 110 and move it into the elevator car 1. A stop plate 166 is fixed to the lower end of the inclined elevator track and provides an abutment face against which the trolley 14 may be advanced thus assuring complete registry of the trolley 14 within the car 1. It should be appreciated that once the trolley 14 is advanced off of the body 72 by the pusher 136, it becomes suspended by the portions 151, 153 of the split rail 148 and therefore the slide 74 does not support the trolley weight once the trolley 14 is advanced into the elevator car 1.

Figure 8:
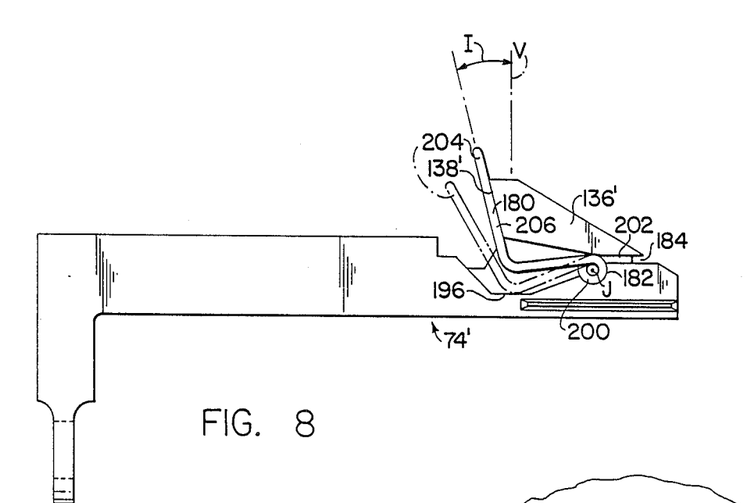
FIG. 8 is a side elevation view of an alternative embodiment of a slide used in the present invention.
Figure 8A:
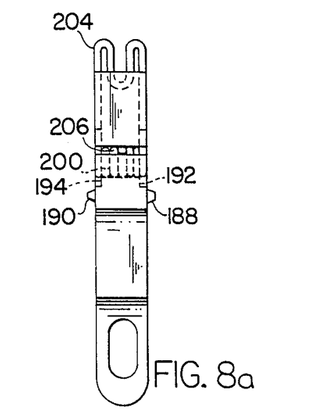
FIG. 8a is an end elevation view taken of the slide shown in FIG. 8 looking to the left.

Referring now to FIGS. 8 and 8a, an alternate embodiment of a slide 74' is shown. The slide 74' in FIG. 8 has been modified to incorporate a stainless steel wire torsion spring 180 housed within a portion of the slide 74'. In addition, the face 138' of the pusher 136' is oriented at an angle I equal to approximately 20 degrees relative to the vertically extending plane V transversely intersecting the slide. A bore 182 is formed in the slide 74' and extends transversely through the slide along with a slot 184 also formed in the slide 74' coextensively with the bore 182 and provides a passage between the bore 182 and the outer surface of the slide 74'. Along each side wall 188 and 190 of the slide 74' are formed shallow indentations 192 and 194 having depth equal to approximately the thickness of the wire forming the spring 180. The indentations 192 and 194 recess the spring 180' inwardly from the surfaces 188 and 190 so that the slide 74' reciprocates within the cavity 118 without the spring interfering with the cavity walls 120 and 122 of the body 72.

The spring 180 is comprised of a coil portion 200, arm portions 206 extending upwardly from each end of the coil portion and a bent loop portion 204 extending between the other ends of each of the arm portions. The arm portions 206 are capable of pivoting about a transversely extending axis J from an upper position shown in solid line in FIG. 8 to a lowermost position shown by the phantom line. To limit this movement to the illustrated range, the indentations 192 and 194 each have at least one abutment face 196 for limiting the downward displacement of the spring arms 206 as they are pivoted about the axis J. The bent loop portion 204 of the spring 180 is normally biased against the face 138' by the resilient force of the spring coil portion 200 utilizing a tab 202 received within the slot 184 to prevent the coil 200 from freely rotating within the bore 182 and thereby generating torque within the coil.

The arms 206 and the tab 202 are generally coaligned with one another when the spring is in its relaxed state. Thus, the spring 180 is inserted within the slide 74' by sliding the coil portion 200 and the arms 206 coaligned with the and tab 202 laterally into the bore 182 and the slot 184. Once the spring 180 is so positioned within the slide 74' the loop portion 204 is pulled forwardly up beyond the peak of the pusher 136' and thereafter is released to engage with the face 138. Since the loop portion 204 is somewhat resilient, the inner U of the loop 204 is capable of being flexed forward over the peak of the pusher 136' and then returning into engagement with the face 138'.

Figure 9:
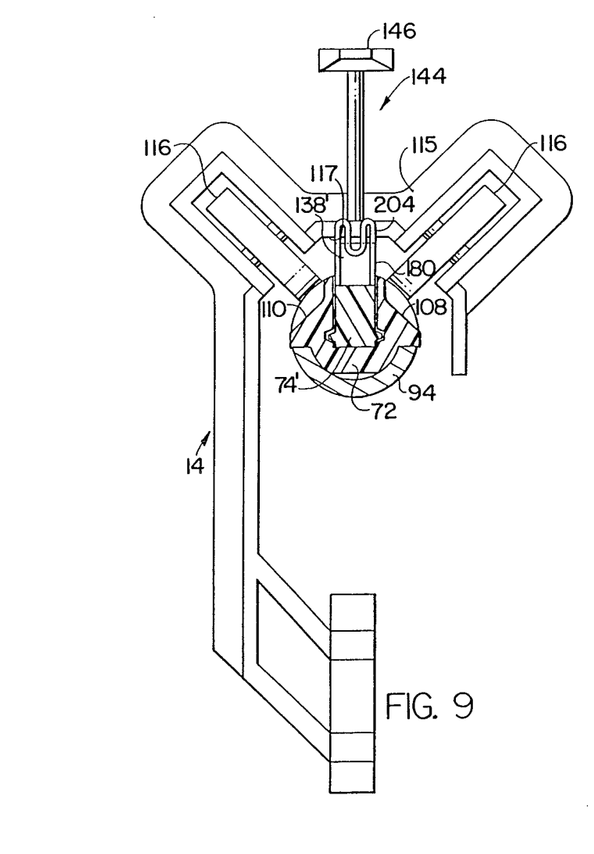
FIG. 9 is a view taken in transverse cross section through a transfer slide assembly employing the slide shown in FIG. 8 and shows a trolley travelling down along the subsidiary loop rail prior to passing over the spring pusher.
Figure 9A:
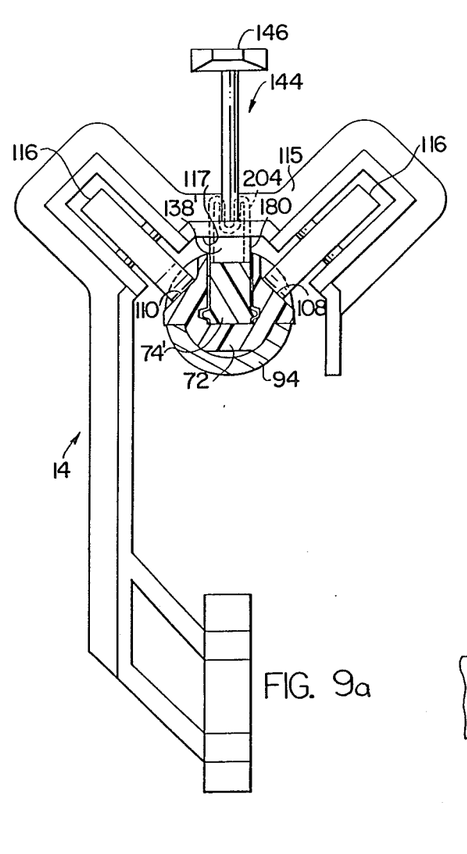
FIG. 9a is a view taken in transverse cross section through a transfer slide assembly employing the slide shown in FIG. 8 and shows a trolley resting on the body of the transfer slide assembly after having travelled over the spring pusher.

As shown in FIG. 9, the loop portion 204 of the spring 180' extends above the under surface 117 of the trolley 14 when the trolley travels along the rail 28. However, the transverse body portion 115 of the trolley 14 will push the loop portion 204 of the spring 180 downwardly against the bias of the coil portion 200 as the trolley 14 rolls down the rail 28 and over the spring 180. As is shown in FIG. 9a once the trolley body portion 115 moves past the spring 180, the spring is no longer depressed by the under surface 117 of the trolley 14 and returns under the bias of the coil 200 back into its generally upright position against the face 138'. Since the trolley 14 now rests on the body surfaces 108 and 110, it now may be positively engaged by the loop portion 204 of the spring 180 to move it into the elevator car 1 as discussed previously. It should be appreciated that the portion of the spring 180 extending above the pusher 136' in FIG. 8 is supported against bending by four parallel spaced apart segments of the loop 204 which abut the face 138' as a trolley is pushed by the loop portion 204 thereby offering increased strength to the spring where it is otherwise unsupported by the surface 138'.

Referring now to FIGS. 10-13, another embodiment of the transfer slide assembly is shown. The operation of the transfer slide assembly 70' in this embodiment is identical to the operation previously discussed with reference to FIGS. 1-7. However, certain structural modifications have been made to the slide 74" and the body 72' in this embodiment.

Figure 10:
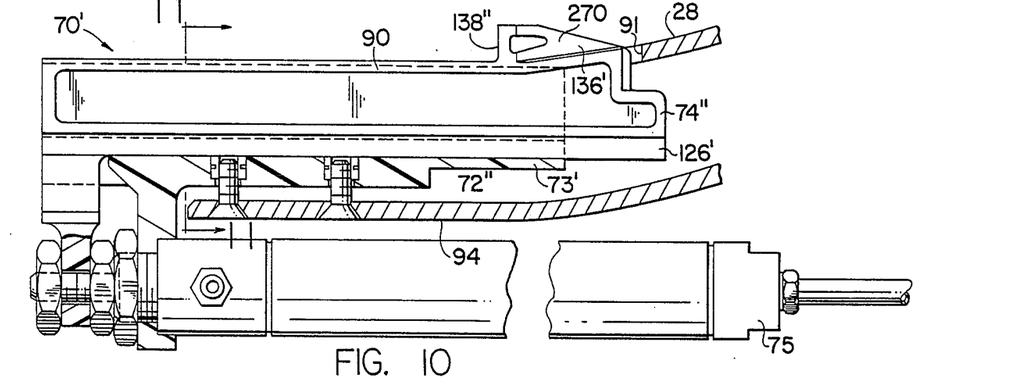
FIG. 10 is a sectional view of another embodiment of the transfer slide assembly embodying the present invention shown separately from the elevator and shows the modified slide in its retracted position.
Figure 11:
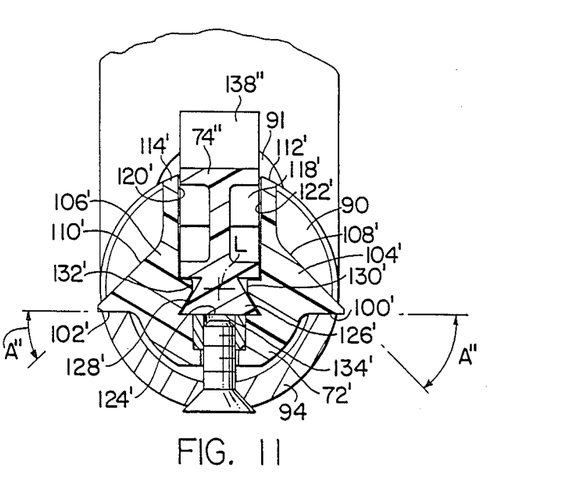
FIG. 11 is an enlarged view taken along line 11—11 in FIG. 10 showing in transverse cross section, the slide as it is received within the body of the transfer slide assembly.

As is shown in FIGS. 10 and 11, the body 72' of the transfer slide assembly 70' is attached to the rail 28 at its lower free end. The cutout 90 in the rail 28 allows the body 72' to be supported by the surfaces 93 and 95 of the lower C-shaped portion 94 of the rail 28 as has been previously discussed. The cavity 118' formed along the axis L of the body 72' and the rear portion 73' is modified in that the parallel spaced apart surfaces 120' and 122' do not have recesses extending parallel to the axis but rather have outwardly protruding angled portions 130' and 132' extending longitudinally throughout the length of the body 72'. Also, the lower end of the slide 74" has in transverse cross section a dovetail configuration extending along its length and defined essentially by two tail portions 126' and 128' correspondingly sized and shaped to cooperate with two angled portions 130' and 132' such that the dovetail may be received within the cavity 118' when it is slid longitudinally between the bottom surface 124' and the angled portions 130' and 132'.

The confronting surfaces of each of the angled and tail portions 130', 132', and 126', 128' are provided with a slight clearance therebetween thus allowing these interengaged portions to slide relative to each other without substantial interference resulting from frictional engagement. However, the slide bottom surface 134' does contact with and bear on the body transverse surface 124' as the slide 74" reciprocates along the axis L of the body 72'. In addition, since both the body 72' and the slide 74" are preferably formed from a generally rigid synthetic material, the engagement between the surfaces 124' and 134' has a low friction characteristic thereby assisting the slidable engagement of the surfaces 124' and 134'. It should thus be appreciated from FIG. 10 that because the dovetail on the slide 74" is coextensively supported along the length of the body 72', the rear portion 73' can be shorter since a substantial portion of the dovetail is still supported within the body 72'.

The laterally extending arm portions 104' and 106' of the body 72' in this embodiment are each defined by the intersection of one of the upper surfaces 108' and 110' with one of the underlying surfaces 100' and 102'. Angle A" in FIG. 11 represents the angle of intersection between these surfaces and is equal to approximately 45 degrees which angle corresponds to the vertical inclination of the trolley rollers 116 thus allowing the rollers 116 to engage correspondingly oriented support surfaces. Since the upper surfaces 108' and 110' directly intersect with the underlying surfaces 100' and 102' rather than being spaced from one another by an intermediate portion, the surfaces 108' and 110' can be spaced a greater distance below the upper surface of the rail 28. This feature is important because it allows the upwardly extending portions 112' and 114' to have greater lengths thereby creating a more effective track by which each trolley is guided on the body 72'.

Figure 12:
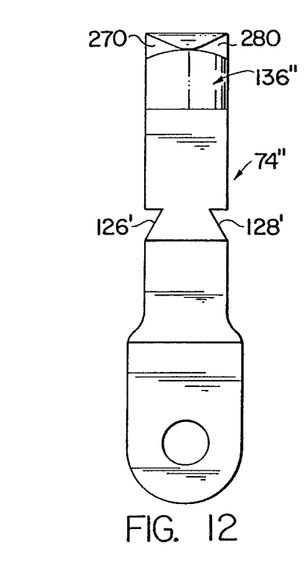
FIG. 12 is an elevation view of the modified slide shown in FIG. 10 looking to the left on FIG. 11.
Figure 13:
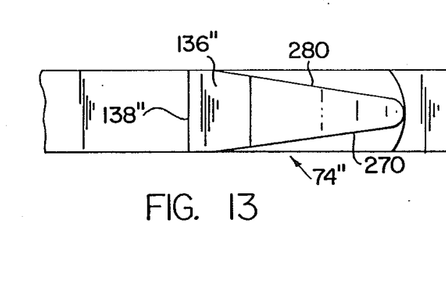
FIG. 13 is a top fragmented view of the slide shown in FIG. 12 showing in detail the pusher structure.

Referring now to FIGS. 12 and 13, the slide 74" shown has a modified pusher 136" with side surfaces 270 and 280 tapering from the face 138" rearwardly toward the slide free end. Each of the surfaces 270 and 280 is disposed symmetrically about the body axis L and extends upwardly above the surface of the rail 28 to present the rollers 116 of an approaching trolley with the body axis L. Thus, it should be appreciated that the pusher 136", while in its retracted position shown in FIG. 10, serves also as a guide to align an otherwise swinging trolley in a parallel relationship with the upwardly extending portions 112' and 114' of the body 72' so that the rollers 116 of the trolley 14 seat evenly upon the surfaces 108' and 110' when the trolley drops from the rail 28 downwardly onto the body 72'.

By the foregoing transfer slides embodying the present invention have been disclosed. However, it should be understood that numerous modifications and substitutions may be made without departing from the spirit of the invention. For example, in a slight modification of the illustrated embodiments the inclined face 136' shown in FIG. 8 may be provided in the embodiment of the slide in FIG. 5 showing a face 136 without any inclination relative to the vertical plane intersecting it. Accordingly, the invention has been described by way of illustration rather than limitation.

We claim:

1. A transfer slide assembly for advancing a trolley from one position to another position comprising:
   an elongate body having a longitudinal axis extending along the elongate extent of said body, said body being fixable to a support and having a cavity formed in said body parallel with said longitudinal axis;
   said body having longitudinally extending spaced apart surfaces and having an opening extending substantially with said cavity and communicating between said surfaces and said cavity, each of said surfaces being positioned along either side of said cavity opening;
   a slide received within said cavity and being moveable longitudinally along said longitudinal axis relative to said body;
   means for moving said elongate slide relative to said body; and
   pusher means extending from said slide for engaging with a trolley to advance it from said one position to said other position.

2. A transfer slide assembly as defined in claim 1 further characterized by said pusher means having a face extending upwardly beyond said body for engaging said trolley; and
   wherein said body is integrally formed with a rear portion and the length of said body and rear portion combined is longer than that of said slide.

3. A transfer slide assembly as defined in claim 1 further characterized by said pusher means having a face extending upwardly beyond said body; and
   said pusher means has two side surfaces each symmetrically disposed about said longitudinal axis and tapering from said face toward one end of said slide.

4. A transfer slide assembly as defined in claim 1 wherein said slide has formed along its lower end a dovetail extending substantially along the length of said slide;
   said cavity having a generally U-shaped configuration in cross section and defining two spaced apart surfaces separated by a cavity bottom surface;
   each of said two spaced part surfaces having an outwardly protruding angled portion extending along said body parallel to said longitudinal axis; and
   said dovetail being positioned between said bottom surface and said angled portions when said slide is received within said cavity.

5. A transfer slide assembly as defined in claim 1 wherein said body has two laterally extending arm portions each defined by the intersection of one of said longitudinally extending surfaces with a surface underlying each of said arm portions; and
   wherein each of said longitudinally extending surfaces also intersects with an upwardly extending body portion to form an angle therebetween.

6. A transfer slide assembly as defined in claim 1 wherein said slide has two side walls each having outwardly extending guides being oriented along each of said slide side walls and extending parallel with said body longitudinal axis; and
   said cavity having a generally U-shaped configuration in cross section and defining two spaced apart cavity side walls each having longitudinally extending recesses corresponding generally in size and in shape to said guides for receiving each of said guides within each of said cavity side walls.

7. A transfer slide assembly as defined in claim 6 wherein said guides are formed on portions of said slide adjacent said pusher means and said pusher means is generally oriented at one end of said slide;
   said slide having a depending portion positioned at the slide other end and having a through opening formed adjacent its lower end; and
   wherein said slide depending portion is connected to said means for moving said slide relative to said body.

8. A transfer slide assembly as defined in claim 1 wherein said body and said slide each have a depending portion extending substantially parallel with one another; and
   said means for moving said slide relative to said body being secured to said body at said body depending portion.

9. A transfer slide assembly as defined in claim 8 wherein said means for moving said slide relative to said body is a double acting actuator having a housing and a neck portion at one end, said actuator having a slidable piston rod extending outwardly from said neck portion;
   said slide depending portion having a through opening formed therein;
   said body depending portion having a counterbore extending therethrough, said counterbore having a first diameter for receiving said actuator housing and having a second diameter smaller than said first diameter for receiving said neck portion of said actuator;
   said slidable piston rod being received within said opening in said slide depending portion and being secured against relative movement therewith; and
   wherein said neck portion is threaded and cooperates with a nut to clamp the body depending portion between said housing and said nut.

10. A transfer slide assembly as defined in claim 6 wherein said body is formed integrally with a rear portion extending along said body longitudinal axis;
    said rear portion having a generally U-shaped cavity contiguously formed with said cavity in said body and having recesses contiguously formed with each of said recesses in said body side walls; and
    wherein said pusher means is positioned adjacent said body rear portion when said transfer slide is in said one position.

11. A transfer slide assembly as defined in claim 2 wherein said body has two upstanding portions contiguous at one end with each of said longitudinally extending spaced apart surfaces and said longitudinally extending spaced apart surfaces on said body are inclined at an angle relative to each of said upstanding portions to form a track; and
    wherein each of said longitudinally extending spaced apart surfaces are inclined at the same angle.

12. A transfer slide assembly as defined in claim 11 wherein said pusher means face extends upwardly above each of said upstanding portions on said body; and
    wherein said pusher means face being oriented coincidentally with a vertically extending plane.

13. A transfer slide assembly as defined in claim 6 wherein said pusher means includes a face extending upwardly beyond said body and being inclined at an angle relative to a vertically extending plane;
    said slide having on each of said side walls an indentation extending substantially longitudinally along each side; and
    spring means received within each indentation and extending generally parallel with and beyond said pusher means face.

14. A transfer slide assembly as defined in claim 13 wherein said slide includes an opening extending laterally therethrough and having a transversely extending axis;
    a slot formed coextensively with said opening and communicating with said slot to provide a passage between said bore and the outer surface of said slide; and
    wherein said spring means is a torsion spring having two spaced apart arm portions extending parallel with each of said side walls and being received within said indentations formed on said slide.

15. A transfer slide assembly as defined in claim 14 wherein said torsion spring further includes a loop portion connecting each of said spaced apart arm portions with one another at one end of said spring adjacent said pusher means inclined surface and having a coil connecting each of said arm portions at said spring other end, said coil being received within said laterally extending opening in said slide; and
    wherein said spring includes a tab portion extending into said slot formed in said slide.

16. A transfer slide as defined in claim 15 wherein each of said arm portions of said spring is pivotable about said transversely extending axis;
    each of said indentations in said slide side walls having an abutment face for limiting the pivotable movement of each of said arm portions about said transversely extending axis; and
    wherein said loop portion is bent such that four parallel spaced apart spring portions engage said pusher means face.

17. In a conveyorized transport system having rails for transporting trolleys from one destination to another, a transfer slide assembly comprising:
    a rail having an upper surface upon which a trolley rides;
    an elongate body having a longitudinal axis and being fixed to free end of said rail, said body having a cavity extending along said body longitudinal axis;
    said body having at least two longitudinally extending surfaces spaced apart from one another by an opening communicating with said cavity for providing a track on which a trolley may travel along said body;
    a slide received within said cavity and being moveable relative to said body along said longitudinal axis;
    said slide having pusher means extending for engaging with said trolley; and
    means for moving said slide relative to said body along said longitudinal axis.

18. In a conveyorized transport system, a transfer slide assembly as defined in claim 17 further characterized by said body spaced apart surfaces being positioned along either side of said cavity and each surface being oriented lower than said upper surface of rail; and
    said pusher means being housed within a longitudinally extending slot formed in said rail free end in its retracted position such that said trolley travels along said rail and over said pusher means and then drops from said rail upper surface onto said longitudinally extending surfaces of said body and is engaged by said pusher means.

19. In a conveyorized trnasport system, a transfer slide assembly as defined in claim 18 wherein said rail at said free end has a cutout along an upper segment thereof and said body is supported by the lower remaining portion of said rail opposite the cutout;

said pusher means further including a face extending upwardly beyond both said body longitudinally extending surfaces and said upper surface of said rail; and guide means carried on said slide adjacent and being cooperative with correspondingly shaped means formed in said body cavity.

20. In a conveyorized transport system, a transfer slide assembly as defined in claim 17 wherein said pusher means includes a pusher face extending upwardly from said slide at an angle relative to a vertically extending plane;

said pusher means further including a spring pivotally mounted within said slide and extending beyond pusher surface; and wherein said means for moving said slide relative to said body is a dual acting actuator.

21. In a conveyorized trnasport system, as defined in claim 17, further characterized by said system including an elevator positioned adjacent said free end of said rail;

said elevator having an elevator car movable between a lower position and an upper position, said lower position being adjacent to and in line with body longitudinal axis;

said trolley having an upwardly extending crown and said elevator car defining a split rail having a slot capable of receiving said crown therein; and said pusher means being engagable with said trolley to advance it from said one position on said body to said another position within said elevator car.

22. In a conveyorized transport system, as defined in claim 21 wherein said elevator car has a depending biasing means positioned within said split rail;

said means for moving said slide relative to said body includes a dual acting actuator connector with said slide; and said pusher means advances said trolley into said split rail of said elevator car and forces said crown against the downward bias of said biasing means.

23. In a conveyorized transport system as defined in claim 22 further characterized by said biasing means positioned within said split rail being a C-shaped leaf spring; and a switch mounted within the split rail of said elevator car and being operable by said leaf spring when said crown is forced against the spring.

* * * * *

UNITED STATES PATENT AND TRADEMARK OFFICE
CERTIFICATE OF CORRECTION

PATENT NO. : 4,884,510

DATED : December 5, 1989

INVENTOR(S) : Robert Vaida, Harold Osthus and Richard Kuchta

It is certified that error appears in the above-identified patent and that said Letters Patent is hereby corrected as shown below:

Column 9, line 8, please change "actuator 75" to --elevator 54--.

Column 9, line 17, please delete "then".

Signed and Sealed this

Thirtieth Day of March, 1993

*Attest:*

STEPHEN G. KUNIN

*Attesting Officer*      *Acting Commissioner of Patents and Trademarks*